United States Patent [19]

Imanari et al.

[11] Patent Number: 5,731,016
[45] Date of Patent: Mar. 24, 1998

[54] APPARATUS FOR MANUFACTURING A DIAPHRAGM BLADE

[75] Inventors: Hitoshi Imanari; Nobuyoshi Nasu, both of Yokohama, Japan

[73] Assignee: Nikon Corporation, Tokyo, Japan

[21] Appl. No.: 659,817

[22] Filed: Jun. 7, 1996

Related U.S. Application Data

[62] Division of Ser. No. 235,523, Apr. 29, 1994, abandoned.

[30] Foreign Application Priority Data

May 7, 1993 [JP] Japan ............................ 5-131254

[51] Int. Cl.⁶ ........................................ B29C 45/18
[52] U.S. Cl. ................... 425/571; 264/323.8; 359/234; 354/228; 354/250; 354/274; 354/254
[58] Field of Search ............................. 425/284, 554, 425/571; 264/328.8; 359/237, 234, 236; 354/228, 250, 254, 270, 274

[56] References Cited

U.S. PATENT DOCUMENTS

| 4,009,946 | 3/1977 | Geyer et al. | 350/266 |
| 4,956,139 | 9/1990 | Koizumi et al. | 425/559 |

FOREIGN PATENT DOCUMENTS

| 63123029 | 5/1988 | Japan . |
| 2-59732 | 2/1990 | Japan . |

*Primary Examiner*—Jay H. Woo
*Assistant Examiner*—Iurie A. Schwartz

[57] ABSTRACT

A diaphragm blade for a diaphragm-blade assembly having a plurality of diaphragm blades forming an opening of a diaphragm. The diaphragm blades cooperatively move to change the diameter of the opening of the diaphragm. Each diaphragm blade has a thin blade sheet and a pair of protruding engage members formed on the blade sheet. Each diaphragm blade is integrally formed with the protruding engage members by injection molding synthetic resin.

4 Claims, 4 Drawing Sheets

APPARATUS FOR MANUFACTURING A DIAPHRAGM BLADE

This application is a division of application Ser. No. 08/235,523, filed Apr. 29, 1994, now abandoned.

BACKGROUND OF THE INVENTION

1. Field of the Invention

The present invention relates to a blade which can be used as a diaphragm blade for a photographic lens of a camera or as a shutter blade for a lens shutter, and a method of manufacturing the blade.

2. Related Background Art

FIGS. 1A and 1B show typical known diaphragm blades consisting of a blade sheet for intercepting light and two protruding engage members (hereinafter referred to as "dowels"). The blade sheet is revolvably supported around one of these dowels, while the other dowel is used to drive the blade sheet.

Several methods of fixing the dowels to the blade sheet are known. First, metal shoulder dowels may be caulked in respective holes drilled through the blade sheet. Second, as disclosed in Japanese Patent Application Laid-open No. 63-123029 and as shown in FIG. 1A, two openings 101a may be formed in a blade sheet 101. The inner peripheries of these openings are cut and bent to form projections 101b. One of the projections 101b projects to the side on which one dowel 102 is provided, and the other to the side on which the other dowel 103 is provided. These dowels 102 and 103 are formed over the respective projections 101b by injection molding. Third, as disclosed in Japanese Patent Application Laid-open No. 2-59732 and as shown in FIG. 1B, each dowel 112 and 113 may be formed by injection molding from both sides of a hole 111a drilled though a blade sheet 111.

According to the above-mentioned conventional methods, the dowels are provided on the blade sheet by caulking or injection molding increasing the cost of production.

According to the first method, in which the shoulder metal dowels are attached by caulking, the cost of preparing such dowels is much higher than the other methods. In addition, it is difficult for the blade to be driven smoothly and swiftly because the coefficient of friction between the dowels and the inner peripheries or the vicinities of the holes is greater than that of the dowels formed by injection molding.

According to the second method, as shown in FIG. 1A in which the projections 101b are formed, over which the dowels 102 and 103 are formed, it is often difficult to maintain the flatness of the blade.

According to the third method, as shown in FIG. 1B in which each dowel is formed by injection molding on both sides of the blade sheet 111, the dowels 112 and 113 must have protruding portions 112a and 113a on their opposite sides. As a result, a pressure plate, arranged on the side of the rotation dowel 112, should have a clearance groove through which the protruding portion 113a on the opposite side of the driving dowel 113 on the opposite side of the driving dowel 113 can escape detachedly from the pressure plate when the blade is driven. At the same time, a lens frame, serving as a fixing member, must be arranged at a certain distance from the blade so that the protruding portion 112a on the opposite side of the rotation dowel 112 cannot touch the lens frame. In addition, in order to prevent the protruding portions 112a and 113a from hindering the adjacent blade sheets 111, when all the blades are assembled and driven, the shape of the blades as well as that of the blade chamber has to be restricted.

SUMMARY OF THE INVENTION

It is an object of the present invention to provide a diaphragm blade and a method of manufacturing the blade having a small number of steps, wherein the flatness of the blade sheet is not damaged nor are the shapes of the blade and the blade chamber restricted.

Objects of the present invention are achieved in a plurality of diaphragm blades which constitute an opening of a diaphragm and cooperatively move to change the diameter of said opening of the diaphragm; and each diaphragm blade is made of synthetic resin and consists of a thin blade sheet and protruding engage members formed integrally with said blade sheet.

Objects of the present invention are also achieved in a method of manufacturing the diaphragm blade comprising molding two protruding engage members on the front surface and the back surface, respectively, of the blade sheet integrally with the blade sheet, and forming an injection gate of a mold at a position corresponding to one of the two protruding engage members.

Objects of the present invention are also achieved in a mold for integrally molding a blade and associated protruding engage members comprising a first mold having a cavity for molding the blade sheet and the protruding engage member to be provided on one surface of the blade sheet and a second mold having a cavity for molding the other protruding engage member to be provided on the opposite surface of the blade sheet.

According to the present invention, as the blade sheet and the protruding engage members are integrally molded, the protruding engage members do not have to be attached to the blade sheet by caulking or injection molding. As a result, the steps required to manufacture the blade is reduced. In addition, the flatness of the blade sheet is maintained. Further, as the protruding portions are not formed on the opposite sides of the protruding engage members, the shapes of the blade and the blade chamber are not restricted.

DESCRIPTION OF THE PREFERRED EMBODIMENT

Figure 1A:
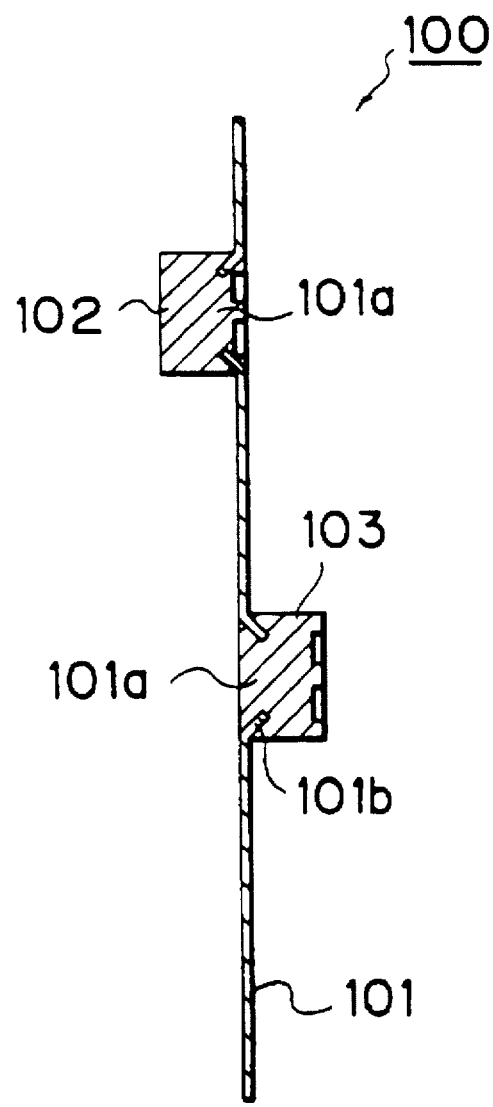
FIGS. 1A and 1B are cross-sectional views showing diaphragm blades in prior art on which the dowels are formed by injection molding.
Figure 1B:
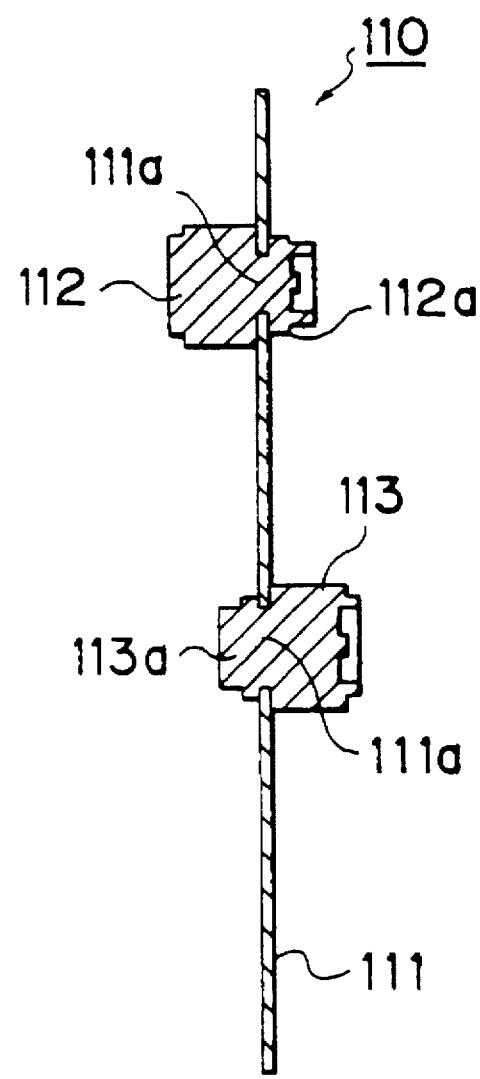

Now, an embodiment of the present invention is described in detail with reference to the drawings, wherein like reference numerals refer to like elements throughout.

Figure 2:
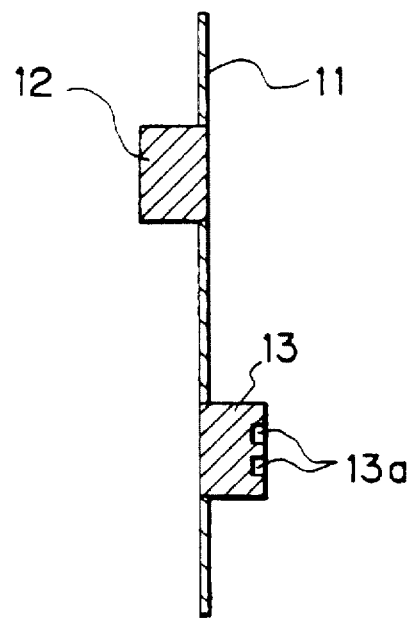
FIG. 2 is a cross-sectional view of a diaphragm blade according to the present invention.
Figure 3:
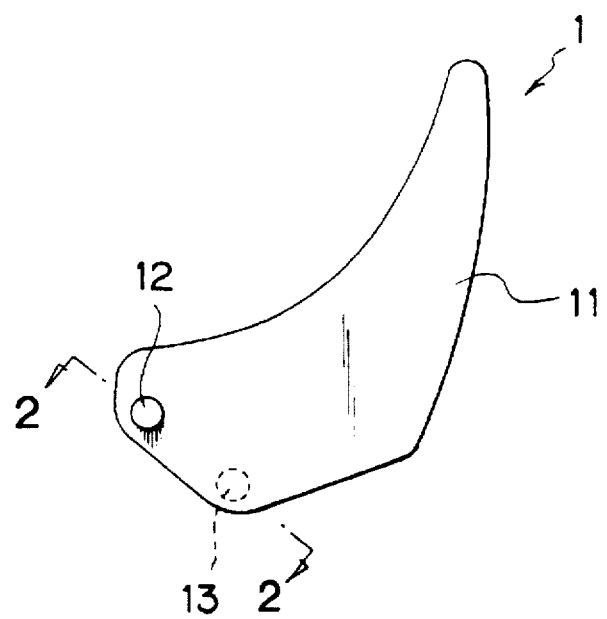
FIG. 3 is a front view of the diaphragm blade according to the present invention.

FIG. 2 is a cross-sectional view of a diaphragm blade according to a preferred embodiment of the present invention. FIG. 3 is a front view of the same diaphragm blade as shown in FIG. 2. The diaphragm blade 1 is preferably made of synthetic resin. A thin blade sheet 11 is integrally molded with a rotation dowel 12 and a driving dowel 13 formed on the front surface and the back surface of the blade sheet 11, respectively.

Figure 4:
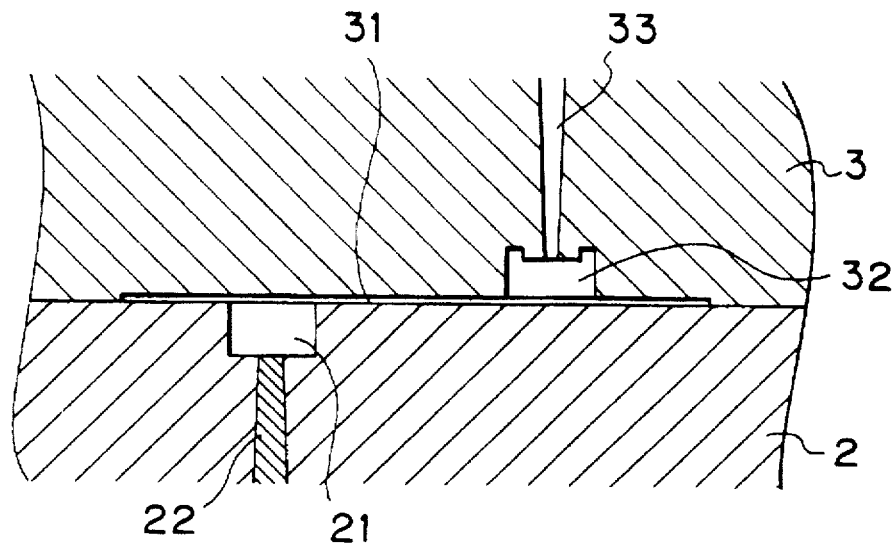
FIG. 4 is a cross-sectional view illustrating the structure of the molds used in an embodiment of the method of manufacturing the diaphragm blade according to the present invention.

The method of manufacturing the above diaphragm blade 1 is described with reference to FIG. 4, which illustrates the structure of the molds employed.

A cope 3 has a cavity 32 for molding a driving dowel 13 which is continuously formed with a cavity 31 for molding the blade sheet 11. The cope 3 also has an injection gate 33 which is formed so as to communicate with the cavity 32 for molding the driving dowel 13. The injection gate 33 and the cavity 32 are in communication with each other at the position corresponding to the center of a dent 13a (see FIG. 2) formed on the driving dowel 13. A drag 2 has a cavity 21 for molding a rotation dowel 12. An ejector pin 22 is arranged under the cavity 21.

First, the cope 3 and the drag 2 are matched. Then, a melted synthetic resin, which is heated to a certain temperature, is cast through the injection gate 33 into the matched molds to integrally mold the blade sheet 11, the rotation dowel 12 and the driving dowel 13.

In consideration of the characteristics required of the blade sheet 11, including strength, smoothness, and so on, as well as good metal filling, preferably polyacetal, a liquid-crystal polymer, or the like is used for molding. Incidentally, if it is required for manufacturing, the position of the injection gate 33 and that of the ejector pin 22 may be exchanged.

Figure 5:
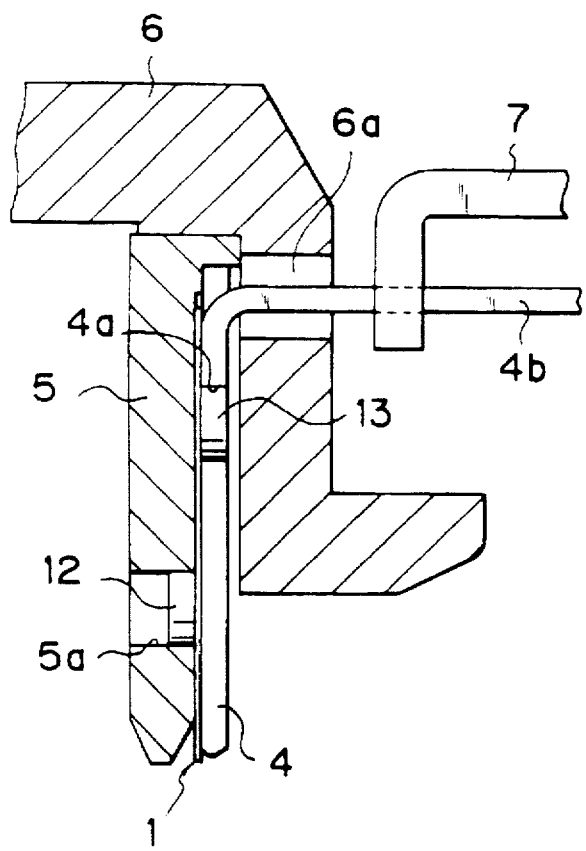
FIG. 5 is a cross-sectional view of the drive mechanism of the diaphragm blades of an embodiment according to the present invention.

FIG. 5 is a cross-sectional view showing a drive mechanism of the blade according to a preferred embodiment of the present invention. A holding member 6 is connected with a lens system (not shown). A blade chamber 5 is fixed to the holding member 6. A hole 5a is formed in the blade chamber 5 so as to engage the rotation dowel 12 of the diaphragm blade 1. An arrow wheel 4 is provided, which has a cam groove 4a with which the driving dowel 13 of the diaphragm blade 1 is engaged. The arrow wheel 4 is revolvably engaged with the blade chamber 5.

A cut and bent portion 4b of the arrow wheel 4, which protrudes from a notch 6a, is joined with a diaphragm lever 7. When the diaphragm lever 7 is operated, the arrow wheel 4 is rotated. At the same time, the driving dowel 13, of the diaphragm blade 1 engaged with the cam groove 4a of the rotated arrow wheel 4, is shifted while rotating in the cam groove 4a. Respective diaphragm blades, constituting the opening of the diaphragm, are driven, at the same time in the way described, and rotated around their respective rotation dowels 13, thereby opening or closing the diaphragm.

Figure 6:
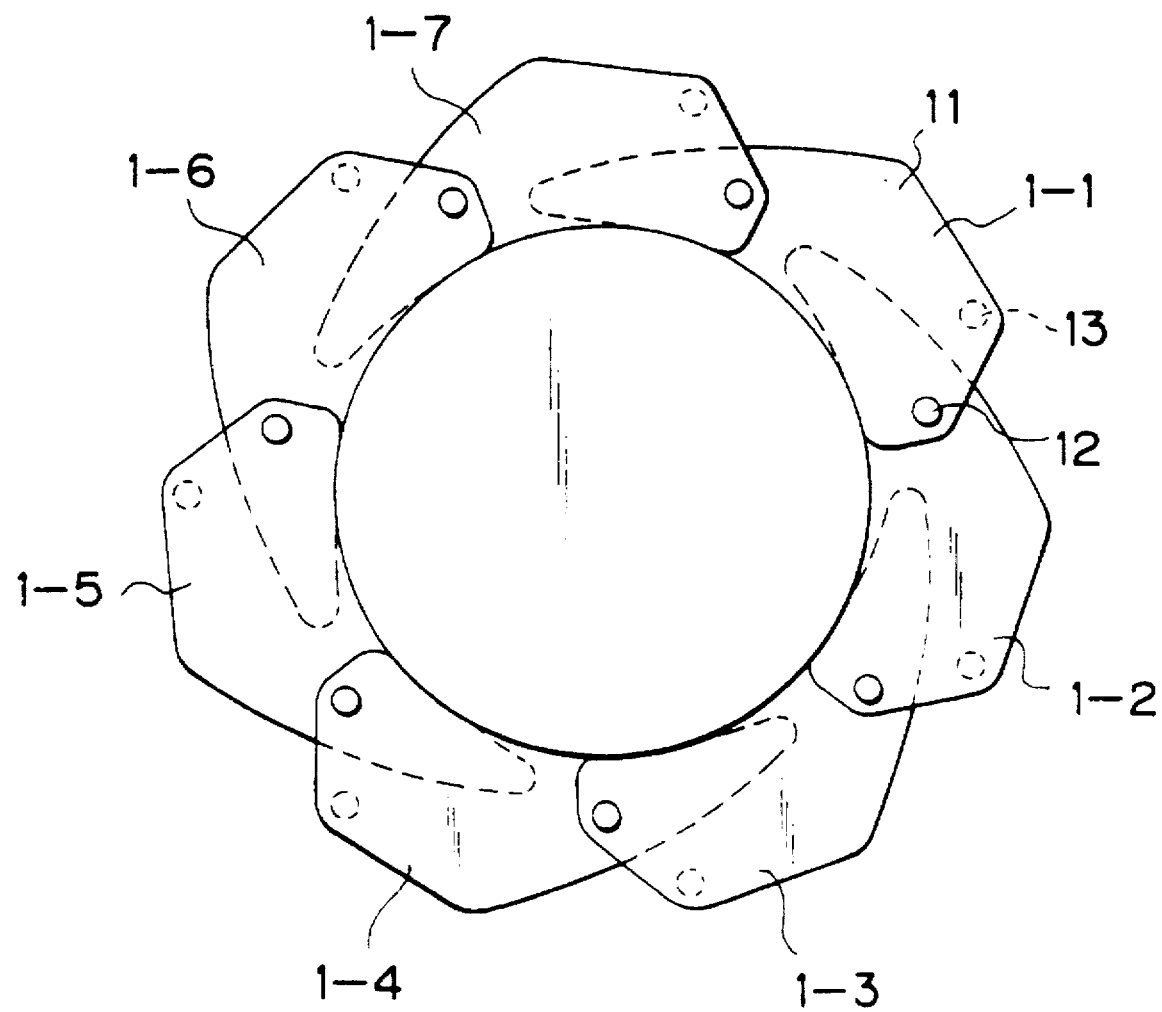
FIG. 6 is a front view showing seven diaphragm blade according to the present invention which are assembled around the blade chamber, wherein the diaphragm is opened.

FIG. 6 is a front view of seven diaphragm blades 1-1 to 1-7 assembled around the blade chamber, wherein the diaphragm is opened. Part of the blade sheet 11 of each blade 1 overlaps with the rotation dowel 12 of the adjacent blade 1. But, as no protruding portion is formed on the opposite surface of the rotation dowel 12, the movement of the blade sheet 11 is not hindered. Accordingly, since the shape of the blade can be decided without a lot of restrictions, the diaphragm blade can be designed more easily and freely.

According to the present invention, the blade sheet and the protruding engage member (dowels) are integrally molded, so the protruding engage members do not have to be attached to the blade sheet by caulking or injection molding. Further, the cutting and bending to form projections on which the protruding engage members are formed by injection molding can be omitted. As a result several steps required to manufacture the diaphragm blade, according to prior art, can be omitted. In addition, since no protruding portions are formed on the opposite surfaces of the protruding engage members, friction between the sliding diaphragm blades can be reduced to realize smooth movement of the diaphragm. At the same time, the diaphragm blade can be designed more easily and freely.

What is claimed is:

1. A mold for a diaphragm blade comprising:

a first mold half having a blade-sheet cavity for forming a blade sheet having a cross section with a constant thickness and a first engage-member cavity formed in the blade-sheet cavity to form a protruding engage member;

an injection gate in communication with the first engage-member cavity on the first mold half; and a second mold half, which mates with the first mold half, the second mold half having a second engage-member cavity to form a second protruding engage member.

2. A mold for a diaphragm blade according to claim 1, wherein said second mold half has an ejector pin in communication with the second engage-member cavity.

3. A mold for forming a diaphragm blade comprising:

a blade-sheet cavity for molding a blade sheet having a cross section with a constant thickness;

a rotation-dowel cavity and a driving-dowel cavity for forming a rotation dowel and a driving dowel, respectively, on the blade sheet;

an injection gate in communication with the driving-dowel cavity; and an ejector pin in communication with the rotation-dowel cavity.

4. A mold for forming a diaphragm blade comprising:

a blade-sheet cavity for molding a blade sheet having a cross section with a constant thickness;

a rotation-dowel cavity and a driving-dowel cavity for forming a rotation dowel and a driving dowel, respectively, on the blade sheet;

an ejector pin in communication with the driving-dowel cavity; and an injection gate in communication with the rotation-dowel cavity.

* * * * *